United States Patent [19]

Smith

[11] Patent Number: 5,768,747
[45] Date of Patent: Jun. 23, 1998

[54] VACUUM CLEANER ACCESSORY

[76] Inventor: Arthur Shawn Dwight Smith, R.R. #3, Mouth of Keswick, New Brunswick, Canada, E0H 1N0

[21] Appl. No.: 529,451

[22] Filed: Sep. 18, 1995

[51] Int. Cl.⁶ .................................................. A47L 9/06
[52] U.S. Cl. ........................................... 15/402; 15/400
[58] Field of Search ............................. 15/402, 397, 393, 15/398, 400

[56] References Cited

U.S. PATENT DOCUMENTS

| | | |
|---|---|---|
| 3,209,386 | 10/1965 | Weber . |
| 3,574,885 | 4/1971 | Jones . |
| 3,668,736 | 6/1972 | Loscalzo . |
| 3,955,238 | 5/1976 | Remijas . |
| 4,190,924 | 3/1980 | Nicholson ................................. 15/402 |
| 4,218,806 | 8/1980 | Cohn ....................................... 15/402 |
| 4,343,265 | 8/1982 | Belschner . |
| 5,074,006 | 12/1991 | Eremita . |
| 5,211,131 | 5/1993 | Plyler ..................................... 15/402 X |
| 5,502,873 | 4/1996 | Hogan ...................................... 15/393 |

*Primary Examiner*—Chris K. Moore
*Attorney, Agent, or Firm*—Lynn S. Cassan

[57] ABSTRACT

A two-component vacuum cleaner accessory for the dual purpose of grooming animals and removing hair and debris from fabric such as that used for upholstery. The body of the accessory has a back and sides and attaches to a circumferential brush which has a skirt and cross-members with downwardly-projecting flexible triangular teeth. Flanges on the brush fit into recesses on the body and serve as handgrips for a user. Pressure drop across the device is controlled by the crosspiece and the design and length of the triangular teeth. The use of soft elastomeric triangular teeth having a high co-efficient of friction provides efficient removal of hair and debris.

4 Claims, 6 Drawing Sheets

5,768,747

VACUUM CLEANER ACCESSORY

FIELD OF THE INVENTION

The invention is a vacuum cleaner accessory that is intended primarily as a grooming tool for removing loose hair and associated debris from animals, but that is also effective for removing hair and dirt from fabric such as that on upholstery or in bedding.

BACKGROUND OF THE INVENTION

There are a large number of curry combs and brushes for grooming animals that are commercially available. Some of these grooming tools have been adapted for attachment to a vacuum machine. Devices of this type are shown, for example, in U.S. Pat. Nos. 3,955,238 (Remijas), 3,574,885 (Jones) and 4,190,924 (Nicholson). Deficiencies with existing devices include configurations of teeth that do not adequately penetrate through the animal's fur down to the skin, stiff and inflexible teeth that irritate or even injure the animal's skin, teeth shape and design that result in hair clogging, and excessive suction pressure on the surface being vacuumed. Minimal attention has been given to the selection of teeth configurations and materials. Nor are the existing vacuum cleaner accessories suitable for the dual functions of both grooming animals and removing hair and dirt from fabric.

SUMMARY OF THE INVENTION

The invention provides a vacuum cleaner accessory and accessory brush for efficiently removing loose hair and associated debris from a variety of substrates that include fabric and animal skin. While the primary function of the accessory device is as a grooming tool for animals, it is also effective for fabric.

The accessory device is comprised of two components, viz. a body and a brush. The body has a back, downwardly-projecting sides and a nozzle for attachment to a vacuum hose. It is preferably molded of high impact rigid thermoplastic material to resist cracking and breakage. It has pins for connection to the brush and recesses to seat handgrips on the brush. The body is preferably ergonomically designed, dimensioned and shaped to fit an average-sized woman's hand. The nozzle is positioned such that an attached vacuum hose does not interfere with use of the device for animal grooming.

The brush is circumferential with a downwardly-extending skirt and includes a plurality of cross-members which join in the interior thereof. The skirt and cross-members have downwardly-projecting, flexible, closely-spaced teeth. It preferably has ribbed handgrips, and boss head receptacles for attachment of the brush to the body. The teeth are preferably triangular in shape and are comprised of a thermoplastic material having a relatively high co-efficient of friction.

BRIEF DESCRIPTION OF THE DRAWINGS

In drawings which illustrate embodiments of the invention.

DETAILED DESCRIPTION OF THE PREFERRED EMBODIMENTS

The vacuum accessory device comprises two components, a body 4 and a brush component referred to herein as brush 2 that are assembled together to form the accessory.

Figure 1:
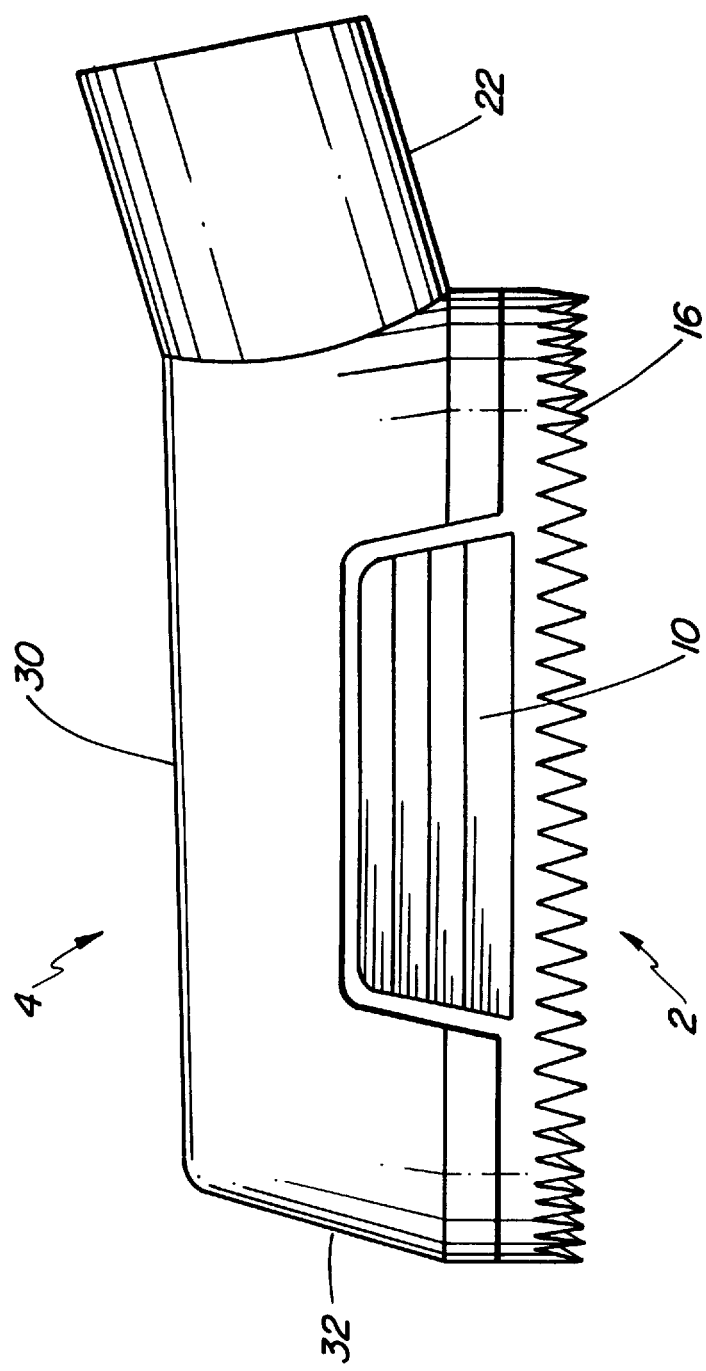
FIG. 1 is a side view of the assembled brush and body.
Figure 2:
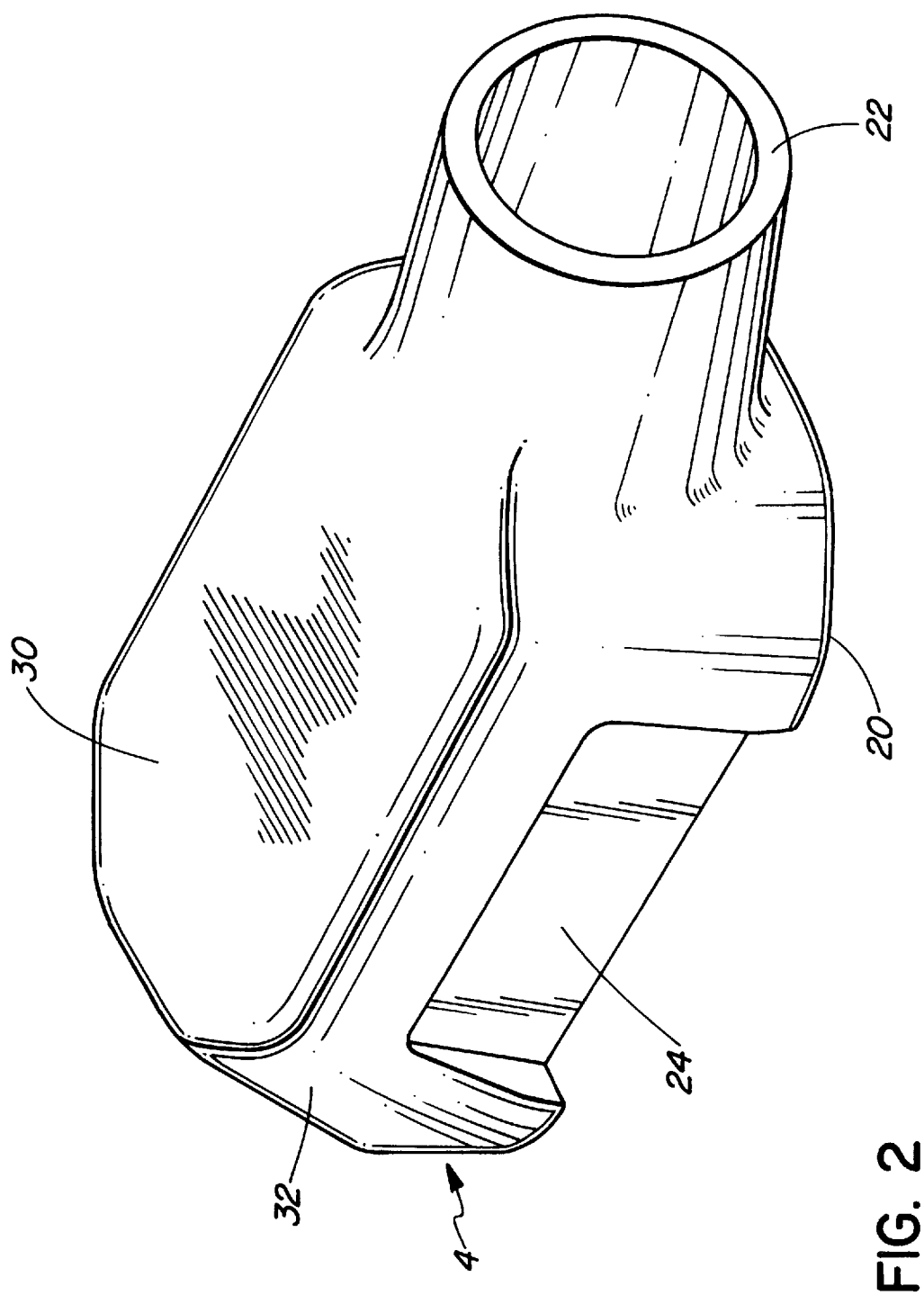
FIG. 2 is a perspective view of the body.
Figure 8:
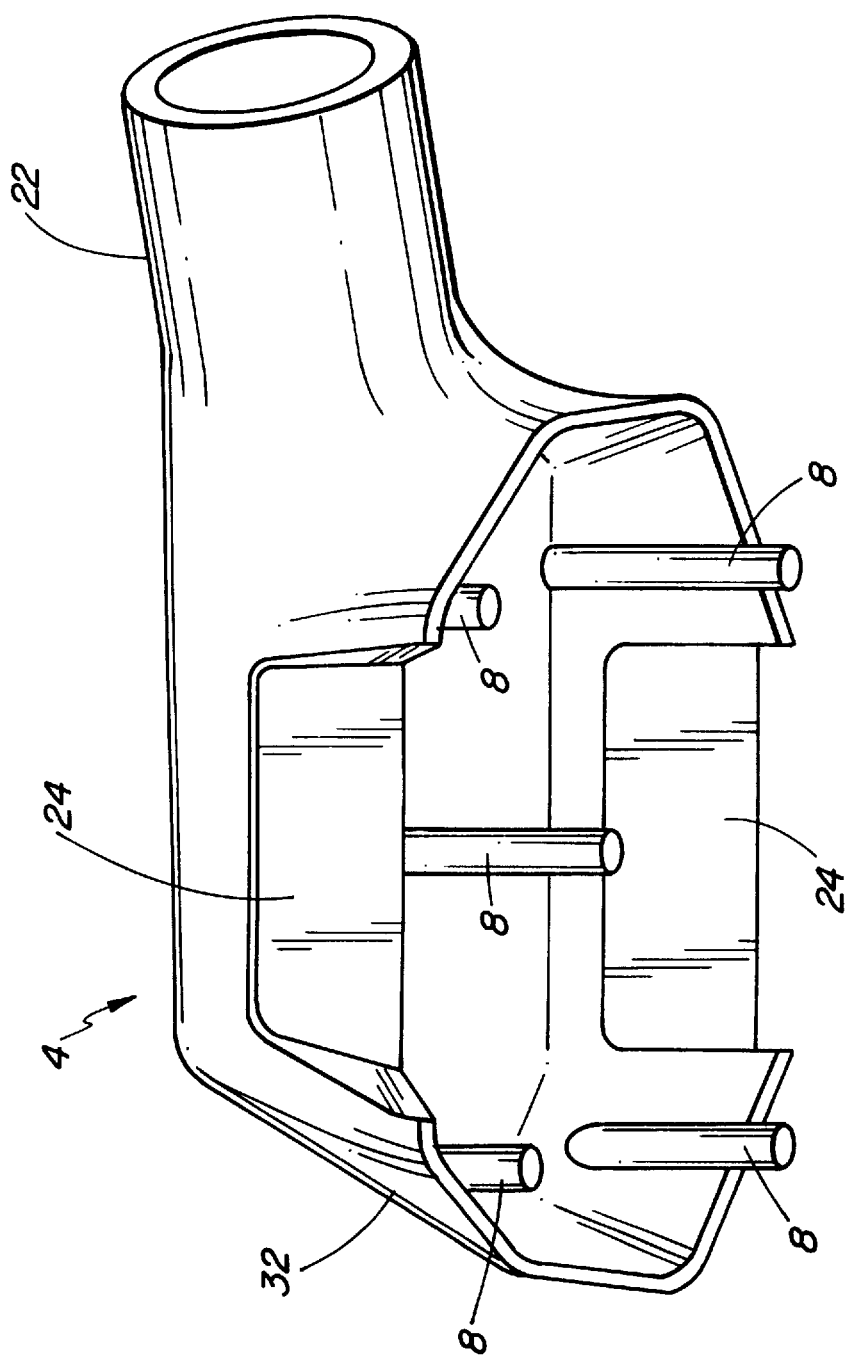
FIG. 8 is a perspective view of the underside of the body.

Referring to FIGS. 2 and 8, the body 4 has a generally flat back 30 and downwardly-projecting sides 32 terminating in a lower edge 20. A tubular nozzle 22 extends from one end of the body for attachment to a vacuum hose. The nozzle 22 opens into a chamber formed by the sides and back of the body 4. An adaptor (not shown) may be provided to connect nozzle 22 to any particular size and configuration of vacuum hose, if necessary. The long sides of the body each have an indented section (recess) 24 which provides a seat for mating handgrips on the brush, as discussed below. Five spaced pins 8 project downwardly from the underside of the body 4 for engagement with the brush.

Figure 3:
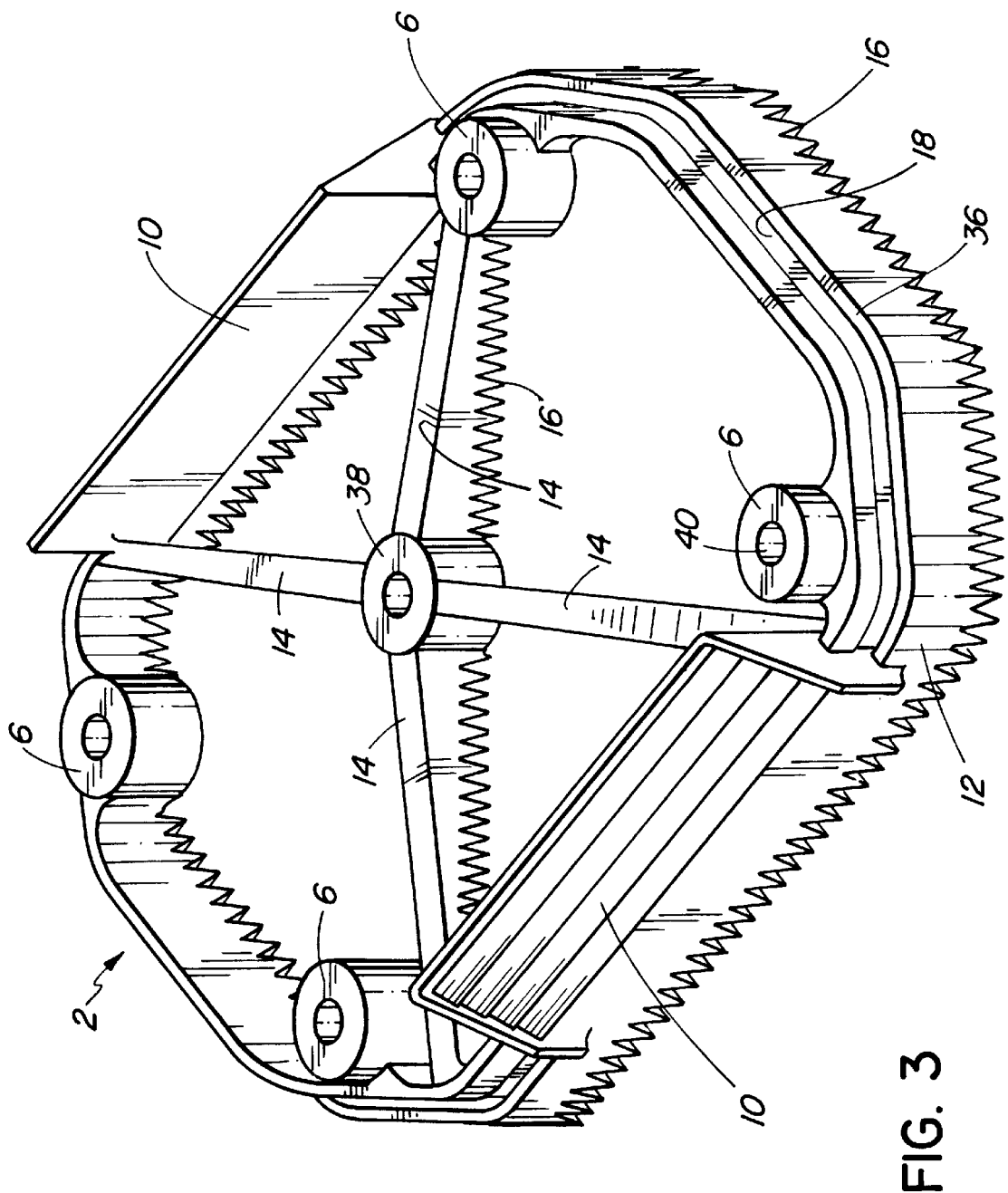
FIG. 3 is a perspective view of the brush.
Figure 4:
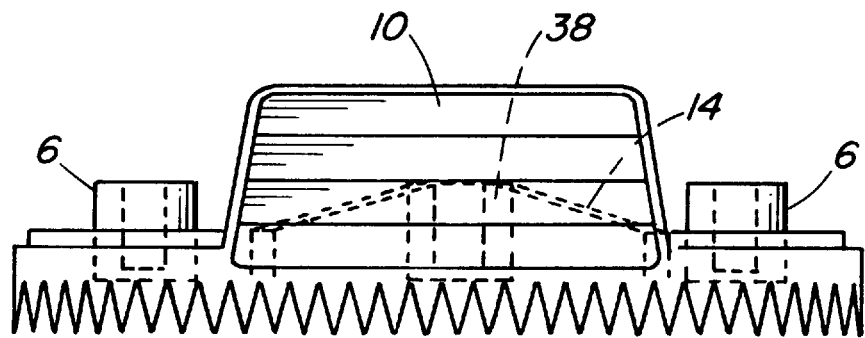
FIG. 4 is the side view of the brush.
Figure 5:
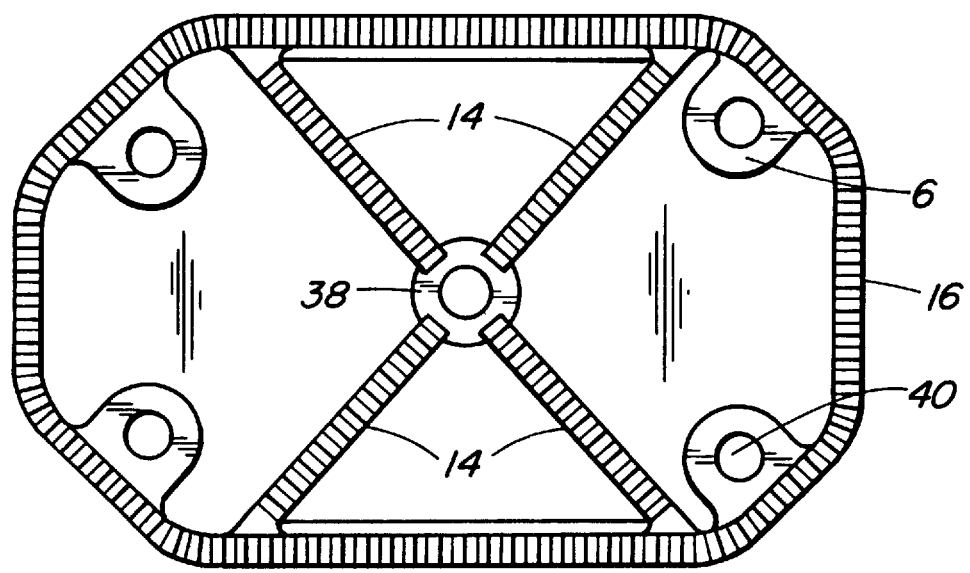
FIG. 5 is the bottom view of the brush.
Figure 6:
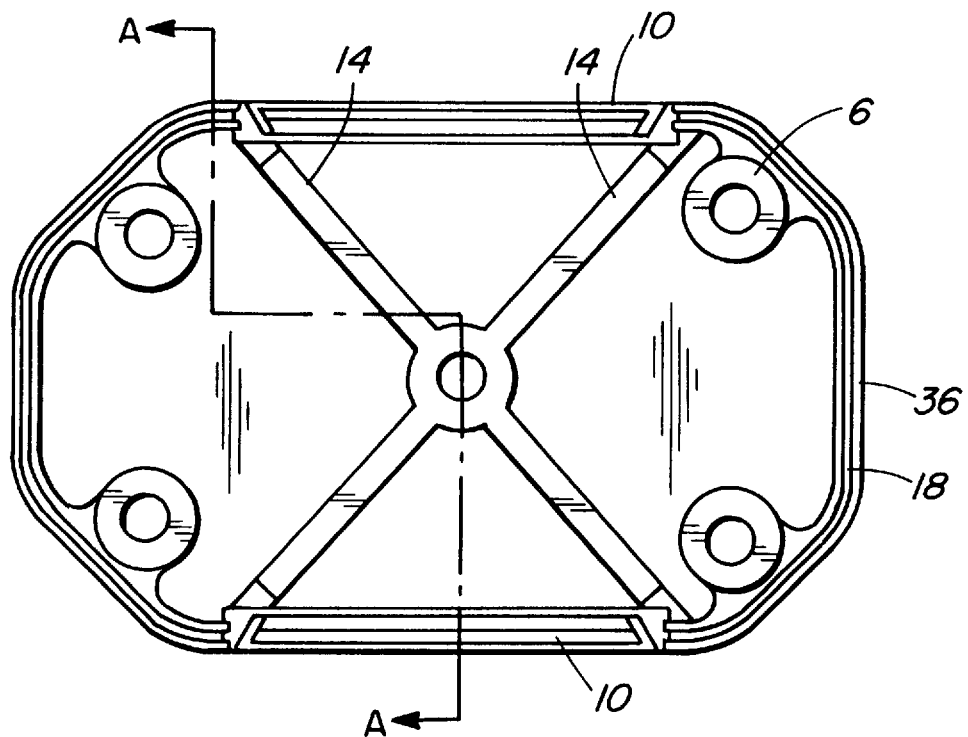
FIG. 6 is a top view of the brush.
Figure 7:
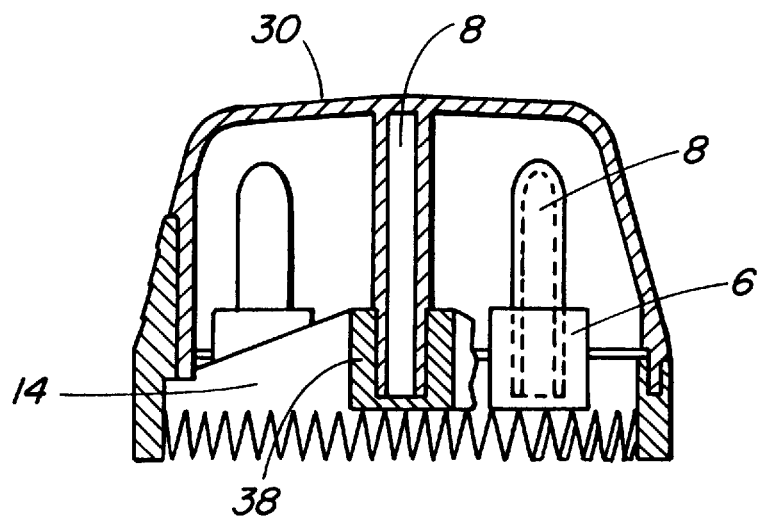
FIG. 7 is a section view on the line A—A of FIG. 6, showing the assembled body and brush.

Referring to FIGS. 3, 5 and 6, the brush 2 comprises a circumferential element defining a wall 36 with a downwardly projecting skirt 12. Groove 18 on the upper surface of circumferential element 36 snugly receives lower edge 20 of the body 4 when the brush and body are assembled. The brush 2 has four cross-members 14 extending from the corners of the circumferential element 36 and joining at the center at boss 38. There are four other bosses 6 at each of the corners of the brush. The bosses 4 and 38 have bores 40 therein to receive the pins 8 of the body 4 when the brush and body are assembled.

The skirt 12 and cross-members 14 have a plurality of closely-spaced triangular teeth 16 on their lower surface. The teeth are flexible and comprised of a suitable thermoplastic material having a sufficiently high co-efficient of friction to adhere to loose hair to be suctioned and sufficient strength to enable the brush to achieve brushing action. Hard or brittle plastics are not useful and are not encompassed within the meaning of "suitable thermoplastic material" herein. Preferably the teeth are about ⅛" wide and about ¼" long.

The brush 2 has two upwardly-extending flanges 10 which fit into recesses 24 on the body when the brush and body are assembled and serve as handgrips when the accessory is held in a user's hand.

To assemble the brush and body, the flanges 10 are pressed over the recesses 24 to provide a friction grip therewith. As well, the bosses 6, 38 are pushed onto the pins 8 on the body, with which they are a friction fit, until the lower edge 20 of the body seats in groove 18 of the brush.

The body is preferably molded of high impact rigid thermoplastic material such as high density polyethylene (HDPE), polypropylene, acrylonitrile butadiene styrene (ABS), and polycarbonate to resist cracking and breakage.

The teeth of the brush and, preferably, the brush as a whole are molded of a suitable thermoplastic material having flexibility, a co-efficient of friction and strength (i.e. stiffness) as described above, so as to maximize hair and dirt removal. The material selected may be a more flexible material having a durometer reading of Shore A47 or a more rigid material having a durometer reading of Shore D63. Such material results in the efficient pulling of dead hair and exposes the hair to the vacuum part of the device for removal. The preferred thermoplastic material for the brush is KRATON G2761 (trademark) having a durometer reading of Shore A65. An additional benefit provided by the flexible elastomer-based rubber teeth is that they then function to pleasantly massage the animal and are non-irritating, in contrast with combs and brushes that have teeth formed from hard plastic or metal. The use of such material for the teeth also permits a flicking action of the teeth as the device is passed over the substrate, which projects both hair, skin dander and debris into the air for ready access to vacuum. The thermoplastic material to be used for any particular brush is selected to have a durometer range which is best suited to the specific intended application.

There are two means by which the brush eliminates excessive suction. First, the interior sections defined by the cross-members provide multiple (i.e. four in the embodiment illustrated) separate vacuum compartments. Second, the length and spacing of the teeth are selected to permit the passage of air flow across the teeth, carrying loose hair and debris to the vacuum source.

The accessory is designed to be comfortable and convenient to use. The body is preferably small enough to be easily gripped by the average hand, though it can be made larger for grooming larger animals. The flanges 10 preferably have ridges to permit a firm grip. The nozzle 22 is positioned to minimize interference from the vacuum hose when the accessory is used for grooming an animal.

I claim:

1. A vacuum cleaner accessory for use in grooming animals and cleaning fabric substrates comprising:

(a) a body having a back, downwardly-projecting sides and a nozzle for attachment to a vacuum source; and, (b) a brush component comprising a circumferential element defining a walls a skirt extending downwardly from said circumferential element, a plurality of spaced cross-members extending inwardly from the sides of said circumferential element and joining together in the interior thereof, and means to attach said body to said brush component, said skirt and cross-members having a plurality of downwardly-projecting, closely-spaced, flexible teeth comprised of a suitable thermoplastic material having a sufficiently high co-efficient of friction to adhere to loose hair to be suctioned and sufficient strength for said brush component to achieve brushing action, wherein said body has two recesses on opposed sides thereof and said brush component has two upwardly extending flanges on opposed sides thereof for engagement with said recesses, said flanges being adapted to be gripped by a user of said accessory.

2. A vacuum cleaner according to claim 1 wherein said brush component is molded of a flexible elastomer based rubber having a durometer reading between Shore A47 and Shore D63.

3. A vacuum cleaner according to claim 2 wherein the shape of said teeth is triangular.

4. A vacuum cleaner according to claim 3 wherein said teeth are about ¼" long.

* * * * *